United States Patent [19]

Matthews

[11] 4,334,504
[45] Jun. 15, 1982

[54] ANIMAL SPRAYING APPARATUS

[76] Inventor: Lloyd J. Matthews, Rte. 2, Warrensburg, Mo. 64093

[21] Appl. No.: 273,927

[22] Filed: Jun. 15, 1981

[51] Int. Cl.³ .................... A01K 13/00; A01K 29/00
[52] U.S. Cl. .................................................. 119/159
[58] Field of Search ...................... 119/156, 158, 159

[56] References Cited

U.S. PATENT DOCUMENTS

| | | | |
|---|---|---|---|
| 2,652,810 | 9/1953 | Paul, Jr. | 119/159 |
| 3,108,574 | 10/1963 | Albers | 119/159 |
| 3,183,890 | 5/1965 | Albers | 119/159 |
| 3,541,996 | 11/1970 | Brockelsby et al. | 119/159 |
| 3,884,192 | 5/1975 | Knapp | 119/159 |
| 3,949,709 | 4/1976 | Myers | 119/159 |
| 4,126,104 | 11/1978 | Overby | 119/159 |
| 4,165,715 | 8/1979 | Knapp | 119/159 |

Primary Examiner—Gene Mancene
Assistant Examiner—Robert P. Swiatek
Attorney, Agent, or Firm—Kokjer, Kircher, Bradley, Wharton, Bowman & Johnson

[57] ABSTRACT

An animal actuated spray apparatus for applying insecticide and other fluids to livestock. A rigid frame which is mounted to one side of an animal passageway includes two pairs of spray nozzles which receive fluid from a pressurized tank. The flow of fluid to the nozzles is controlled by normally closed valves which are selectively opened by an actuator arm tripped when an animal moves through the passageway. The nozzles are arranged and controlled such that one pair of nozzles sprays one side of an animal moving in one direction and the other pair of nozzles sprays the other side of the animal upon return through the passageway in the opposite direction.

10 Claims, 8 Drawing Figures

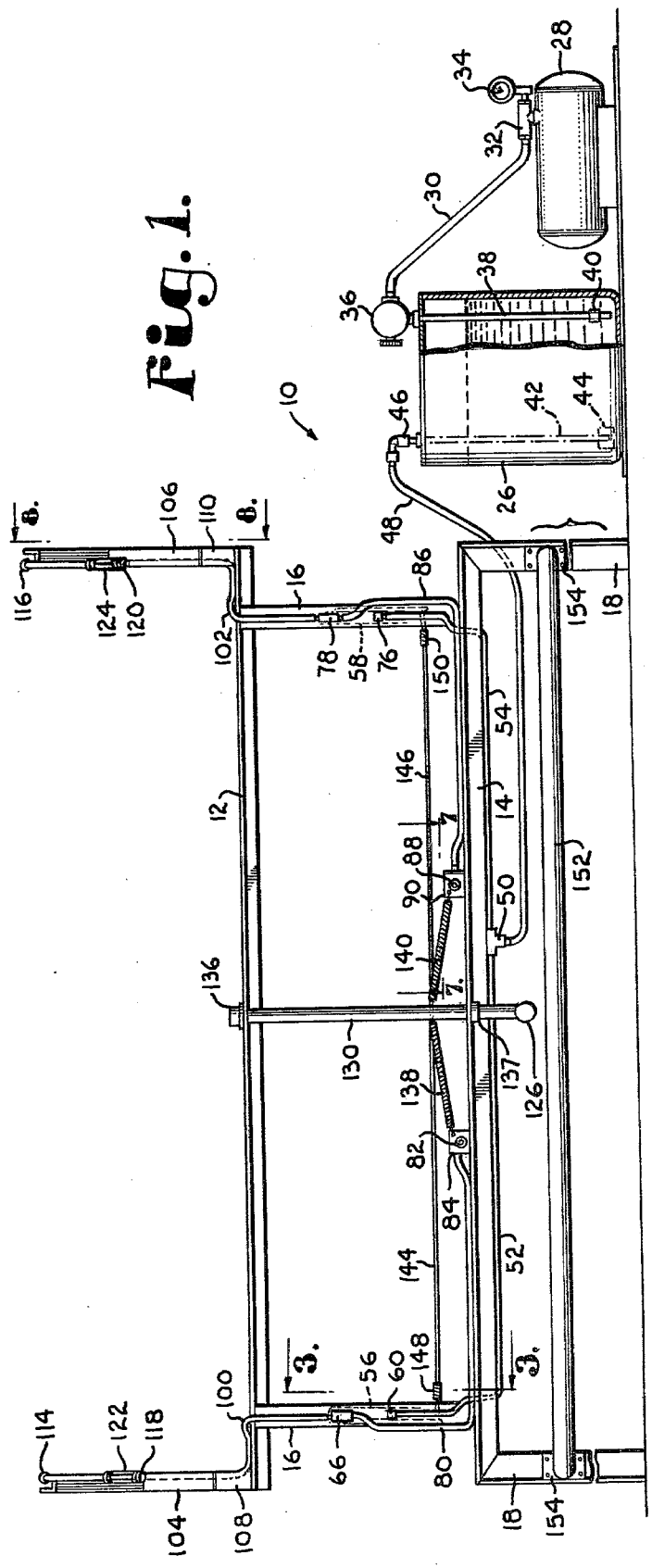

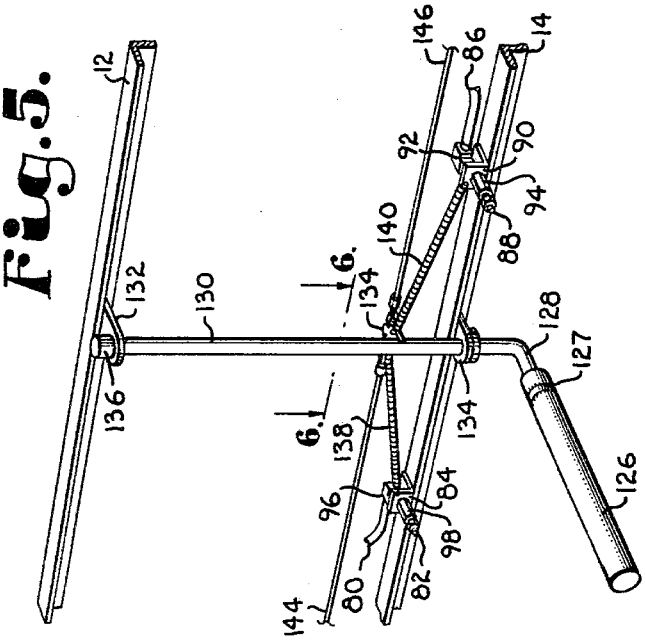
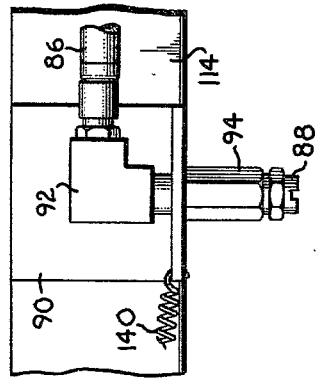
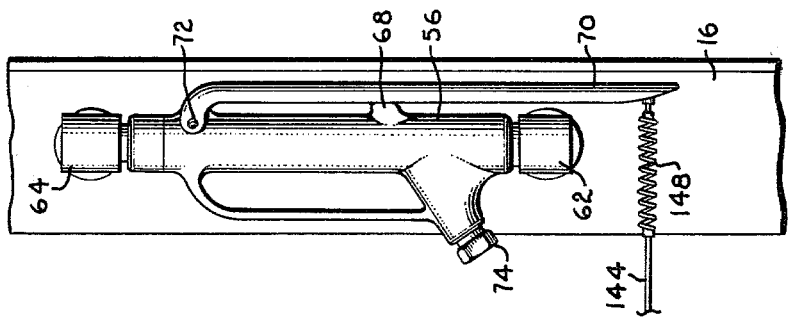
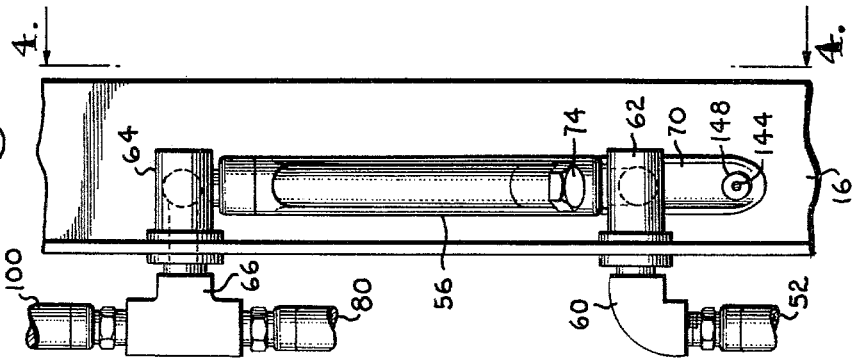

ANIMAL SPRAYING APPARATUS

BACKGROUND AND SUMMARY OF THE INVENTION

This invention relates in general to the spraying of livestock and more particularly to an automatic spraying system for applying insecticides and the like to cattle and other animals.

The proper care of livestock requires that the animals be periodically treated with insecticides and other substances. Typically, the cattle are rounded up and sprayed by a hand-held sprayer. As can easily be appreciated, this method of insecticide application involves considerable time and labor on the part of the person or persons carrying out the spraying operation. Perhaps even more importantly, the manual spraying of livestock is such an unpleasant task that it is often neglected or delayed unduly, and the cattle suffer accordingly.

In attempts to eliminate the need for manual spraying of livestock, various types of automatic spray systems have been proposed, as shown in U.S. Pat. Nos. 3,884,192 and 4,165,715 to Knapp, U.S. Pat. No. 3,949,709 to Meyers and U.S. Pat. No. 4,126,104 to Overby. Spray devices such as those shown in the aforementioned patents have not been successful, due in large part to their high cost and undue complexity. All of these devices require a large and complicated frame which forms both sides of a restricted animal passageway, and spray nozzles must be located on both sides of the frame in order to adequately spray the body of the animal. The specially constructed animal passages which are formed by the machines tend to frighten the animals and cause them to resist moving through the passage. The machines that spray in response to the movement of an animal through the device in either direction use an excessive amount of treatment fluid, while those such as Myers which spray in only one direction include complicated mechanisms for deactivating the sprayer when the animal travels in the opposite direction.

The devices which are treadle operated require a special raised floor for the treadle mechanism, and this adds significantly to the cost and complexity and to the resistance of the animals to the spray equipment. The complicated devices that activate the spray nozzles also increase the cost and complexity of the machine. Another problem with the spraying equipment that has been proposed in the past is that the spray nozzles and other components are positioned where they are susceptible to being damaged by the animals.

The present invention is directed to an improved spray system for livestock and has, as its primary goal, the provision of an animal spray apparatus which is simple and economical to construct and install and which thoroughly and uniformly applies treatment fluid to livestock.

More specifically, it is an important object of the invention to provide an animal operated spray apparatus which automatically sprays one side portion of an animal passing in one direction and the other side when the animal returns in the opposite direction. Consequently, the spray nozzles can all be mounted on one side of the animal passageway, and there is no need to connect hoses and the like to both sides as is necessary in prior art equipment.

Another object of the invention is to provide a spray apparatus having a frame that is smaller and simpler than the frames of the spray devices proposed in the past. The frame can be bolted or otherwise mounted to a surface such as a gate located on one side of an already existing passage through which animals routinely move during feeding, drinking or other activity. As a result, there is no need for the frame to form both sides of an animal passage, and the frame can be simplified considerably in comparison to the frames of prior art devices.

Yet another object of the invention is to provide a spray apparatus of the character described in which the spray nozzles are located and arranged to apply treatment fluid to the animal in a thorough and uniform manner for effective treatment of insects and other afflictions. The spray heads are arranged in two pairs, each of which includes an upper nozzle for thoroughly spraying the head and back of the animal and a lower nozzle for spraying the side portion of the animal. One pair of nozzles sprays one side of the animal passing in one direction, and the other side of the animal is sprayed by the other pair of nozzles when the animal returns in the opposite direction.

In conjunction with the preceding object, it is a further object of the invention to provide, in a spray apparatus of the character described, an improved actuator mechanism for activating and deactivating the spray nozzles at appropriate times to thoroughly treat the animals without waste of the treatment fluid.

An additional object of the invention is to provide a spray apparatus of the character described which operates in a safe and reliable manner without frightening or harming the animals.

A still further object of the invention is to provide, in a spray apparatus of the character described, a guardrail which effectively keeps the animals away from the spray nozzles and other components which could be damaged if encountered by the animals.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 1 is a side elevational view of an animal spraying apparatus constructed according to a preferred embodiment of the present invention, with the actuator arm in its normal position and the broken away portions indicating continuous height;

FIG. 2 is a top plan view of the spraying apparatus, with the broken lines indicating deflection of the actuator arm in opposite directions from the normal position;

FIG. 3 is a fragmentary view on an enlarged scale taken generally along line 3—3 of FIG. 1 in the direction of the arrows;

FIG. 4 is a fragmentary elevational view taken generally along line 4—4 of FIG. 3 in the direction of the arrows;

FIG. 5 is a fragmentary perspective view of the actuator arm and associated components, including the lower two spray nozzles;

FIG. 6 is a fragmentary view on an enlarged scale taken generally along line 6—6 of FIG. 5 in the direction of the arrows;

FIG. 7 is a fragmentary top plan view on an enlarged scale taken generally along line 7—7 of FIG. 1 in the direction of the arrows; and FIG. 8 is a fragmentary elevational view on an enlarged scale taken generally along line 8—8 of FIG. 1 in the direction of the arrows.

Referring now to the drawings in more detail and initially to FIGS. 1 and 2, an animal spraying apparatus constructed in accordance with the present invention is generally identified by numeral 10. The spraying apparatus 10 has a rigid frame which includes a pair of horizontal angles 12 and 14. Vertical angles 16 interconnect the horizontal angles 12 and 14 near their opposite ends. Leg portions in the form of angles 18 extend downwardly from the opposite ends of the lower horizontal angle 14.

As best shown in FIG. 2, the frame of the spraying apparatus can be installed on a gate 20, as by bolting the angle members making up the frame to the gate. It is to be understood that the frame can also be bolted or otherwise mounted to a side of a building, to a corral, or to any other suitable structure. Spaced from and parallel to the gate 20 or other surface on which the frame is mounted is another surface 22. Between surfaces 20 and 22, an animal passageway 24 is presented having sufficient width to accommodate the passage of cattle and other livestock. It is contemplated that the passageway 24 will provide the sole means of access to and from a food supply or drinking trough (not shown) such that the livestock will periodically travel through the passageway in both directions.

In accordance with the invention, liquid insecticide or other fluid which is to be applied to the livestock is contained within a tank 26 (see FIG. 1). The interior of tank 26 is maintained under pressure (15-25 p.s.i., for example) by air which is supplied from a portable air tank 28 holding air under pressure (125 p.s.i., for example). The air is directed from tank 28 to tank 26 through an air line 30 which is equipped with a shut off valve 32 and a pressure gauge 34. A pressure regulator 36 regulates the pressure and connects with a vertical tube 38 having an open bottom and a check valve 40. The open bottom end of tube 38 is located near the bottom of tank 26 well below the liquid level in the tank so that air is applied near the tank bottom in order to agitate the liquid within the tank and prevent settling.

The insecticide or other spray fluid contained within tank 26 is discharged through a vertical tube 42 having an open bottom end equipped with a strainer 44. Tube 42 connects through a shut off valve 46 with a flexible hose 48 leading to a "T" fitting 50 which is suitably secured to angle member 14 near the center thereof. Extending in opposite directions from the "T" fitting are a pair of flexible hoses 52 and 54 which extend along the bottom edge of angle 14 and then upwardly along the respective left and right vertical angles 16. The hoses 52 and 54 connect with respective valves 56 and 58 which are mounted near the centers of angles 16.

The valves 56 and 58 are constructed in the same manner, and only one valve (56) will be described in detail. With reference particularly to FIGS. 3 and 4, hose 52 connects at its end with an elbow fitting 60. The elbow 60 connects through one of the flanges of angle 16 with a mounting block 62 connected with the lower end of valve 56. The top end of valve 56 connects with another mounting block 64 which is mounted to the flange of angle 16 and which connects through the flange with a "T" fitting 66.

Valve 56 is a normally closed valve which normally blocks flow between its lower and upper ends. A plunger 68 (FIG. 4) is biased outwardly by an internal spring (not shown). The plunger 68 contacts one side of an operating lever 70 having its upper end pivoted at 72 to the valve body. As previously indicated, the internal spring (not shown) normally maintains plunger 68 in the extended position shown in FIG. 4. However, when the operating lever 70 is moved toward the valve body, it depresses plunger 68 and thereby opens the valve such that fluid is able to flow from the lower end of the valve to its upper end and thus between the elbow and "T" fitting 66. An adjustment screw 74 can be adjusted to vary the force exerted on plunger 68 by the internal spring, thus adjusting the force that must be applied to the operating lever 70 for depression of the plunger and opening of the valve.

As previously indicated, the valve 58 mounted on the right angle 16 is constructed in the same manner as valve 56. Hose 54 leads to an elbow 76 which directs fluid to the bottom of valve 58. The top of valve 58 connects with a "T" fitting 78. Valve 58 blocks the flow from elbow 76 to "T" fitting 78 when the valve is closed and permits flow when the valve is open, as described in connection with valve 56.

A flexible hose 80 connects with the bottom end of "T" fitting 66 and extends downwardly along angle 16 and inwardly along angle 14 to connection with a spray nozzle 82. The nozzle 82 is supported on a bracket 84 which is in turn mounted on the upper flange of angle 14 outwardly of the center thereof. A hose 86 extends from the bottom end of the other "T" fitting 78 and leads to a nozzle 88 supported on a bracket 90. The bracket 90 is mounted on angle 14 on the opposite side of the center from bracket 84, with the two brackets 84 and 90 being equidistant from the center of angle 14.

As best shown in FIG. 7, the nozzle 88 located on the right side of angle 14 receives fluid from hose 86 through an elbow fitting 92 and a nozzle body 94 supported on the bracket 90. The other nozzle 82 is similarly supplied with fluid from hose 80 through an elbow 96 (FIG. 5) and a nozzle body 98. Nozzles 82 and 88 are located at a height to spray the side portions of the cattle or other livestock which move through passageway 24. Each nozzle body 94 and 98 contains a filter and a check valve (not shown).

Extending upwardly from the top ends of "T" fittings 66 and 78 are respective hoses 100 and 102. Hoses 100 and 102 extend outwardly along the upper angle 12 to the outer ends thereof and then upwardly along metal braces 104 and 106, respectively. The braces 104 and 106 are secured to respective metal brackets 108 and 110 which are bolted to the upper flange of angle 12, as indicated at 112 in FIG. 8. Each brace 104 and 106 extends upwardly and inwardly or away from gate 20 and is bent inwardly at a more drastic angle at its upper portion, as shown in FIG. 8. The hoses 100 and 102 are clamped by hose clamps 114 and 116 to the upper ends of the respective braces 104 and 106. Beyond the end of the brace, each hose hangs generally downwardly and inwardly. Spray nozzles 118 and 120 are located on the ends of the respective hoses 100 and 102. Nozzles 118 and 120 have respective nozzle bodies 122 and 124 each of which contains a filter and check valve unit (not shown).

The upper nozzles 118 and 120 are overhead nozzles located about centrally across the width of passageway 24 and above the cattle which pass through the passageway. Nozzles 118 and 120 are located and oriented to spray the head, neck and back area of the cattle or other livestock passing through passageway 24.

The valves 56 and 58 which control the flow of spray fluid to the nozzles are in turn controlled by a trip lever or actuator arm which takes the form of a section of rubber hose 126. As best shown in FIG. 5, the hose 126 is fitted on and clamped at 127 to a short horizontal stub portion 128 on the lower end of a vertical shaft 130. Shaft 130 extends through openings formed in lugs 132 and 134 projecting from angles 12 and 14, respectively. Shaft 130 has an enlarged collar 136 on its top end and another collar 137 (see FIG. 1) which prevent vertical movement of the shaft.

Shaft 130 is able to rotate with respect to lugs 132 and 134 to permit hose 126 to pivot through an arc of approximately 180° about the vertical axis provided by the shaft. At either extreme position, hose 126 extends generally parallel to angle 14. Hose 126 is horizontal at all positions.

A pair of tension springs 138 and 140 continuously urge hose 126 toward a normal position wherein the hose is normal to angles 12 and 14 and projects substantially across passageway 24, as shown in solid lines in FIG. 2. One end of spring 138 is hooked to a lug 142 (see FIG. 6), and the opposite end of spring 138 is hooked to bracket 84. One end of the other spring 140 is similarly hooked to lug 142 at one end and to bracket 90 at the opposite end. In this manner, the springs 138 and 140 normally maintain hose 126 in position to be tripped by animals passing through passageway 24.

The valves 56 and 58 are controlled by cables 144 and 146, respectively. One end of each cable 144 and 146 is connected with lug 142. Tension springs 148 and 150 connect with the opposite ends of the respective cables 144 and 146, and the springs connect with the bottom ends of the operating levers of the respective valves 56 and 58, as shown in FIG. 4 for lever 70.

A guardrail 152 carries brackets 154 (see FIG. 1) on its opposite ends which are bolted or otherwise secured to the legs 18 of the frame. The guardrail 152 is located within the passageway 24 at a height to keep animals away from the lower spray nozzles 82 and 88 and other components of the apparatus which could possibly be damaged by the animals. Hose 126 is located above the guardrail 152 at a height to be tripped by the bodies of animals passing through the passageway 24.

In use, the spraying apparatus is installed on gate 20 or another surface forming one side of a passageway 24 through which livestock routinely move in both directions, as previously indicated. For example, a feeding area or drinking trough (not shown) may be located beyond the left end of the passageway such that the cattle move through the passageway from right to left in order to eat or drink and from left to right when departing from the feeding or drinking area.

The pressurized insecticide or other fluid contained within tank 26 is forced through hose 48 "T" fitting 50 and hoses 52 and 54 to the valves 56 and 58. Both of the valves 56 and 58 are closed when hose 126 is in its normal position (solid line position in FIG. 2), since the springs 148 and 150 incorporated in cables 144 and 146 do not apply sufficient force on the valve operating levers to depress the valve plungers. Thus, all of the spray nozzles are normally deactivated.

However, an animal moving through passageway 24 from right to left encounters hose 126 and deflects the hose in the same direction as the animal is moving. Such deflection pulls cable 144 tight, and spring 148 is then placed under sufficient tension to overcome the opposing force applied by the internal spring associated with plunger 68. The cable 144 and spring 148 pull lever 70 toward the body of valve 56 and depress plunger 68 to open the valve. The spray fluid is then able to flow through the valve from elbow 60 to "T" fitting 66 and in equal amounts to nozzles 82 and 118. It is contemplated that the nozzles 82 and 118 will be activated when the animal has moved far enough to deflect hose 126 to approximately the position shown in broken lines on the left side of FIG. 2. At this time, the animal is properly positioned for spraying to begin.

Nozzle 82 sprays the entire side and leg portion of the animal, while the upper nozzle 118 sprays the head, neck and back area of the animal. When the animal has moved through passageway 24 far enough to clear hose 126, the hose is released and, since spring 138 is under tension, the hose 126 is quickly returned to the neutral position wherein nozzles 82 and 118 are again deactivated.

In this manner, the right side of the animal is sprayed by nozzle 82, and the right portion of the head, neck and back of the animal is sprayed by the upper nozzle 118. Once the animal has cleared the nozzles, hose 126 is released to deactivate the spray apparatus to prevent wasting of spray fluid.

When the animal thereafter returns through passageway 24 from left to right, he encounters hose 126 and deflects it in the direction of movement of the animal. Thus, the hose 126 is deflected to the position shown on the right side of FIG. 2, and the cable 146 is pulled such that valve 58 is opened in the same manner discussed previously in connection with valve 56. Spray fluid is then able to flow through the valve and in equal amounts to spray nozzles 88 and 120. The lower nozzle 88 sprays the left side of the body of the animal, while the upper nozzle 120 sprays the head, neck and back area of the animal and particularly the left portions thereof. Again, once the animal has cleared hose 126 the hose is released and returned to the neutral position due to the tense condition of spring 140. Nozzles 88 and 120 are thereby deactivated automatically once the animal has bypassed them.

It is thus apparent that the spraying apparatus 10 thoroughly and uniformly applies spray fluid to the entire body of the animal since the animal must necessarily pass through passageway 24 first in one direction and then in the opposite direction. The spraying of only one side of the animal at a time permits the entirety of the apparatus to be installed on only one side of the passageway and thus eliminates the need for providing connections, hoses, nozzles and other components on both sides of the passageway. The structure of the apparatus is thereby simplified without sacrificing effectiveness in the spraying operation. When the animal passes through the passageway from right to left, nozzles 88 and 120 remain deactivated at all times, while the other pair of nozzles 82 and 118 remain deactivated when the animal passes from left to right through the passageway. The symmetrical arrangement of the spraying apparatus permits it to be mounted on either side of the passageway and results in uniform treatment of both sides of the cattle passing back and forth through the passageway.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Animal spray apparatus for installation on one side of an animal passageway, said apparatus comprising:
    a frame adapted to be mounted on said one side of the passageway;
    spaced apart first and second spray means on said frame each normally deactivated and each located and oriented to spray the side portion of an animal passing thereby in the passageway;
    a source of spray fluid communicating with said first and second spray means to apply the spray fluid thereto; and
    animal operated actuator means in the passageway for controlling said first and second spray means, said actuator means activating said first spray means and maintaining said second spray means in the deactivated condition when an animal passes through the passageway in a first direction and said actuator means activating said second spray means and maintaining said first spray means in the deactivated condition when an animal passes through the passageway in a second direction opposite said first direction,
    whereby one side portion of an animal is sprayed by said first spray means when the animal passes through the passageway in said first direction and the other side portion of the animal is sprayed by said second spray means when the animal passes through the passageway in said second direction.

2. Apparatus as set forth in claim 1, wherein said actuator means includes:
    an actuator arm on the frame located between said first and second spray means and having a normal position extending into the passageway in the path of an animal passing therethrough, said actuator arm being deflected in one direction when engaged by an animal passing through the passageway in said first direction and in an opposite direction when engaged by an animal passing through the passageway in said second direction;
    means for returning said actuator arm to the normal position when the animal has passed beyond the arm;
    means for maintaining both said first and second spray means in the deactivated condition when the actuator arm is in said normal position;
    means for activating said first spray means and maintaining said second spray means deactivated when said actuator arm is deflected in said one direction; and
    means for activating said second spray means and maintaining said first spray means deactivated when said actuator arm is deflected in said opposite direction.

3. Apparatus as set forth in claim 2, wherein said actuator arm is connected with said frame in a manner to pivotally deflect about a substantially vertical pivot axis.

4. Apparatus as set forth in claim 1, wherein said actuator means includes:
    an actuator arm;
    means for mounting said actuator on said frame for pivotal movement about a generally vertical pivot axis located substantially midway between said first and second spray means;
    yieldable means for urging said arm toward a normal position wherein the arm projects horizontally from said frame into the passageway in the path of an animal traveling therethrough, whereby an animal travelling through the passageway in said first direction deflects said arm in one direction about said pivot axis and an animal travelling through the passageway in said second direction deflects said arm in an opposite direction about said pivot axis, said yieldable means returning said arm to the normal position when the animal has passed the arm;
    first and second normally closed valves for the respective first and second spray means activating the corresponding spray means when open and deactivating the corresponding spray means when closed; and
    first and second cables connecting said actuator arm with the respective first and second valves in a manner to open said first valve when said actuator arm is deflected in said one direction and to open said second valve when said arm is deflected in said opposite direction, said valves being closed in the normal position of said actuator arm.

5. Apparatus as set forth in claim 1, wherein:
    said first spray means comprises a first pair of spray nozzles including an upper nozzle located and oriented to spray the head and back area of an animal passing thereby in the passageway and a lower nozzle located and oriented to spray the side portion of an animal passing thereby in the passageway; and
    said second spray means comprises a second pair of spray nozzles including an upper nozzle located and oriented to spray the head and back area of an animal passing thereby in the passageway and a lower nozzle located and oriented to spray the side portion of an animal passing thereby in the passageway.

6. Apparatus as set forth in claim 5, wherein said actuator means includes:
    an actuator arm mounted on the frame for pivotal movement about a generally vertical pivot axis at a location substantially midway between the lower spray nozzles, said actuator arm having a normal position extending into the passageway in the path of an animal passing therethrough and being capable of deflection in both directions about said pivot axis;
    first and second normally closed valve means for controlling the flow of spray fluid to the respective first and second pairs of spray nozzles; and
    means for opening said first valve means in response to deflection of said actuator arm in one direction corresponding to movement of an animal through the passageway in said first direction and for opening said second valve means in response to deflection of said actuator arm in an opposite direction corresponding to movement of an animal through the passageway in said second direction.

7. Apparatus as set forth in claim 6, including spring means for returning said actuator arm to the normal position thereof when an animal clears the actuator arm.

8. Apparatus as set forth in claim 6, wherein said opening means includes:
a first cable connected at one end with said first valve means and at an opposite end with said actuator arm in a manner to effect opening of said first valve means when said actuator arm is deflected in said one direction; and
a second cable connected at one end with said second valve means and at an opposite end with said actuator arm in a manner to effect opening of said second valve means when said actuator arm is deflected in said opposite direction.

9. Apparatus as set forth in claim 8, including yieldable means for urging said actuator arm toward the normal position.

10. Apparatus as set forth in claim 5, including a guardrail on said frame located to maintain animals in the passageway away from said lower nozzles.

* * * * *